US005443678A

United States Patent [19]

Chevalier et al.

[11] Patent Number: 5,443,678

[45] Date of Patent: Aug. 22, 1995

[54] METHOD AND APPARATUS FOR MANUFACTURING A PRODUCT COMPRISING A SUBSTRATE ON WHICH AN ADHESIVE WITH DELAYED ACTION AND A PROTECTION STRIP ARE LOCATED

[75] Inventors: Pierre A. M. Chevalier, 31, Boulevard d'Auteuil, Boulogne, Hauts de Seine 92100; Jacques P. Chevalier, Neuilly sur Seine; Gilbert E. Veniard, Paris, all of France

[73] Assignee: Pierre A. Chevalier, Boulogne, France

[21] Appl. No.: 114,085

[22] Filed: Aug. 31, 1993

Related U.S. Application Data

[62] Division of Ser. No. 656,177, Apr. 23, 1991, Pat. No. 5,350,477.

[30] Foreign Application Priority Data

Jun. 28, 1989 [FR] France ................................ 89 08650
Jun. 28, 1990 [WO] WIPO ................. PCT/FR90/00482

[51] Int. Cl.⁶ ............................................ B32B 31/00

[52] U.S. Cl. .................................... 156/356; 156/358; 156/498; 156/529; 156/548; 156/549; 156/578

[58] Field of Search ............... 156/356, 357, 358, 498, 156/517, 521, 529, 578, 581, 582, 547, 548, 549

[56] References Cited

U.S. PATENT DOCUMENTS

| | | | |
|---|---|---|---|
| 2,051,319 | 8/1936 | Sieg | 156/357 |
| 2,980,159 | 4/1961 | Greene | 156/549 |
| 3,728,985 | 4/1973 | Dunlap et al. | 118/410 X |
| 4,049,485 | 9/1977 | Iverson | 156/358 X |
| 4,179,325 | 12/1979 | Staats et al. | 156/498 |
| 4,314,868 | 2/1982 | Hirakawa et al. | 156/356 X |
| 4,531,996 | 7/1985 | Sukenik | 156/472 |
| 4,806,183 | 2/1989 | Williams | 156/356 X |

FOREIGN PATENT DOCUMENTS

| | | | |
|---|---|---|---|
| 0536518 | 4/1993 | European Pat. Off. | 156/358 |

*Primary Examiner*—David A. Simmons
*Assistant Examiner*—Paul M. Rivard
*Attorney, Agent, or Firm*—Armstrong, Westerman, Hattori, McLeland & Naughton

[57] ABSTRACT

The process relates to the production of a product consisting of a substrate to which an adhesive with long-term effect and a protective band are attached to permit use of the adhesive to be deferred. The process is characterized by the use of a substrate whose surface to which the adhesive is attached may present irregularities. The adhesive is heated to a temperature at which is becomes paste-like and almost liquid, and is brought to an opening situated above a plane surface on which the substrate has been placed. The adhesive is then caused to flow simultaneously with a relative movement between the substrate and the opening. This results in the adhesive being deposited on the substrate as a strand that is preferably continuous. The temperature of the adhesive is then lowered in order to increase its viscosity until it becomes paste-like to the point of turning solid. Pressure is thereafter applied to the paste, like adhesive, preferably with the imposition of a protective strip, in order to cause spreading of and to cover the strand along its full length. Finally, the resultant product may be cut to produce a substrate having an adhesive strip thereon and a detachable protection band covering the adhesive strip.

28 Claims, 4 Drawing Sheets

FIG.5
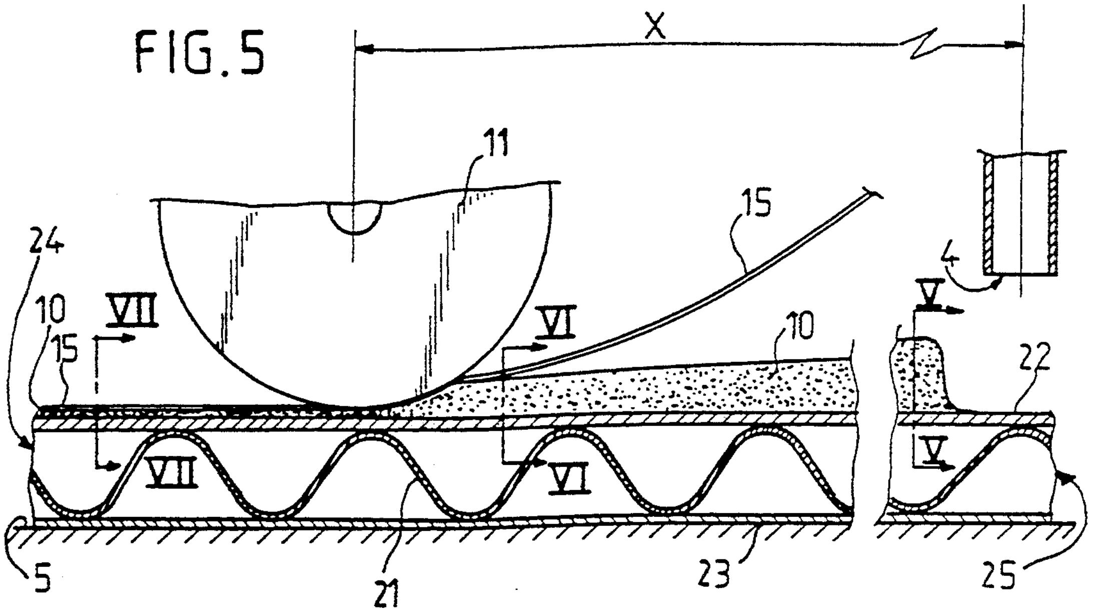
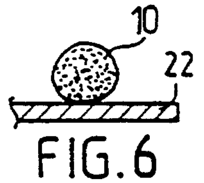
FIG.6
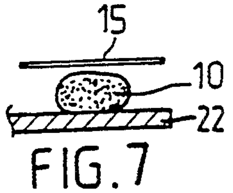
FIG.7
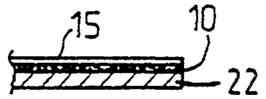
FIG.8
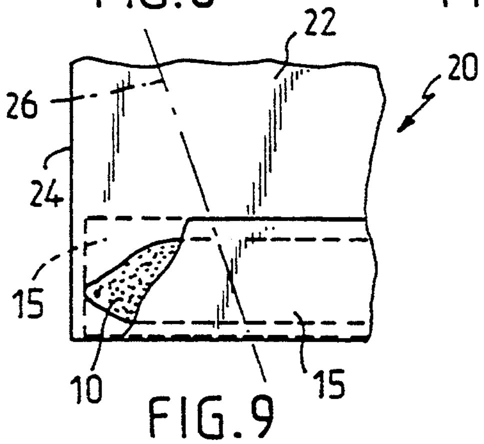
FIG.9
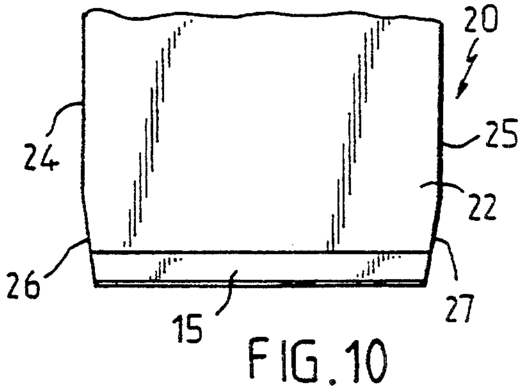
FIG.10
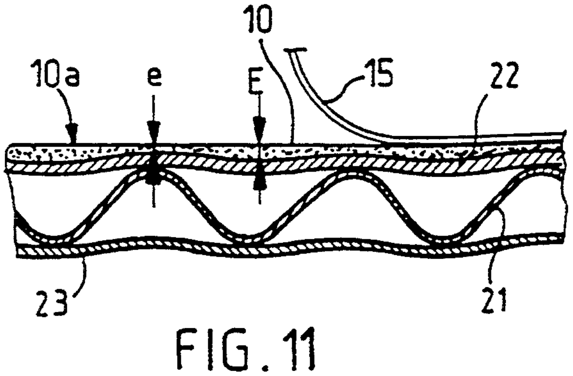
FIG.11
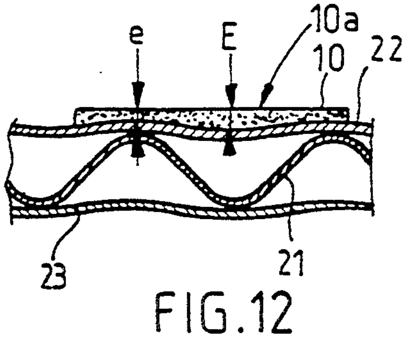
FIG.12

FIG.13
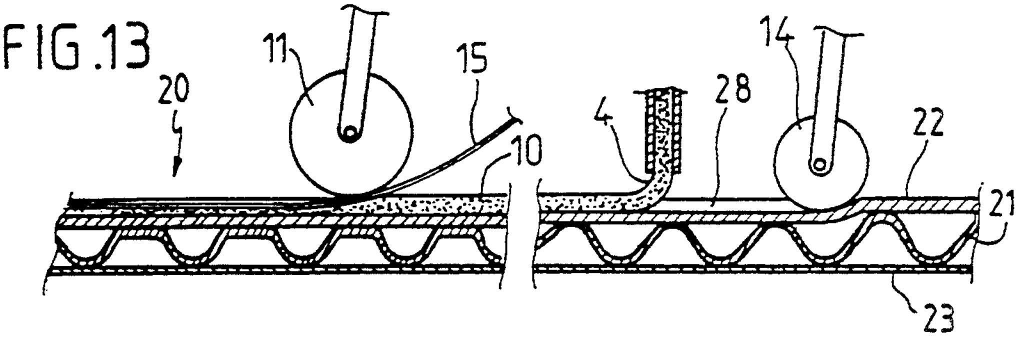
FIG.15
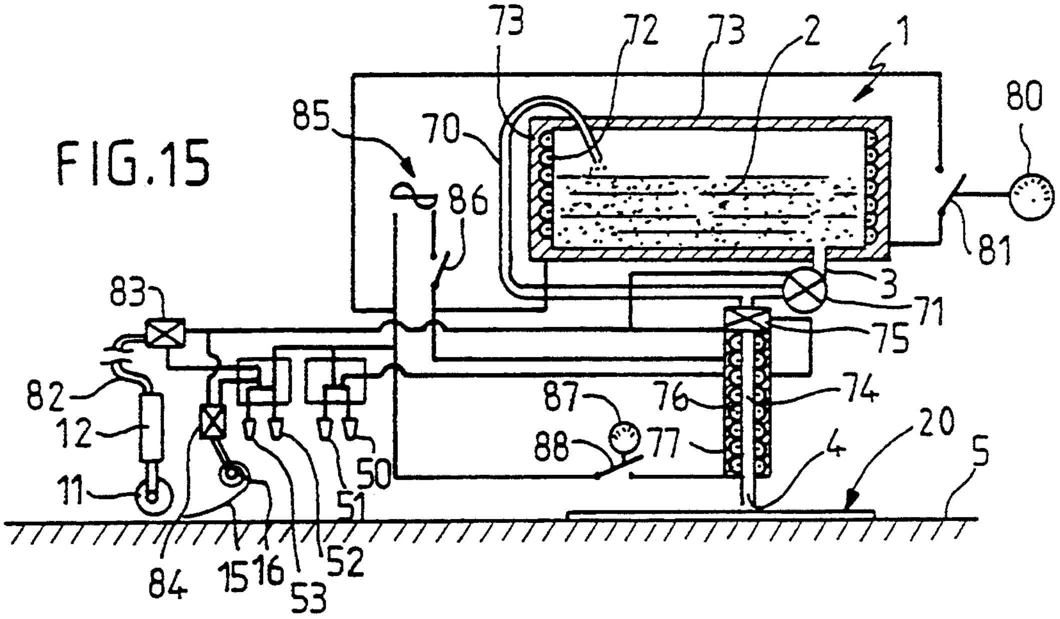
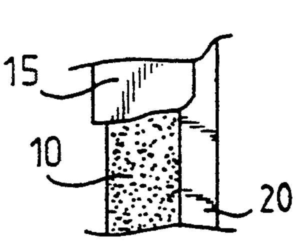
FIG.16
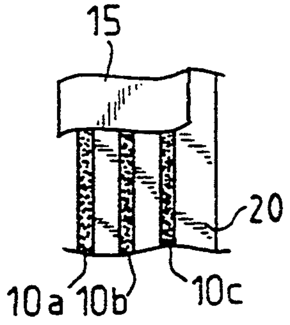
FIG.17
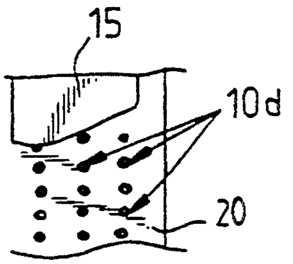
FIG.18

METHOD AND APPARATUS FOR MANUFACTURING A PRODUCT COMPRISING A SUBSTRATE ON WHICH AN ADHESIVE WITH DELAYED ACTION AND A PROTECTION STRIP ARE LOCATED

This application is a division of application Ser. No. 07/656,177, filed Apr. 23, 1991; which is a U.S. national phase of PCT/FR90/00482, filed Jun. 28, 1990 now U.S. Pat. No. 5,350,477.

Modern adhesives have attained an excellent degree of effectiveness, and the trend is to use them more generally by replacing other assembly means. In the field of cardboard articles, and more particularly for packaging, for example, it is often more advantageous to join two parts with glue rather than with hinges or connection tabs.

The general problem, in fixation with an adhesive, can be subdivided into two categories: immediate adhesive bonding, and delayed adhesive bonding. The present invention substantially relates to this second category, which combines all the cases where an adhesive must first be placed on one part, or "substrate", and where then the substrate coated with adhesive, which does not need to be used until later, sometimes quite a long time later, is to be held until it joins the substrate to a "destination" surface, after all sorts of processes have taken place, such as, for example, printing, fashioning, storage, packaging, transportation, shipping, storage once again, removal from storage to retail, various handling operations, and so forth.

The technique of instant gluing has become relatively simple, because in the final analysis it is now reduced to the selection of one species of adhesive, and, as applicable, adapting the adhesive chosen to the problem presented by adjusting its composition and/or its setting time, because both parts are fixed at the same time, and there is no longer a need to distinguish an adhesive substrate and a destination surface. On the other hand, delayed-action adhesive bonding is more complex because it must meet quite diverse requirements, which derive from the existence of three separate situations instead of only one. These situations are:

the deposition of adhesive on a given substrate;

resistance of the adhesive to aging and to physical/mechanical stresses; and effectiveness of the same adhesive on the destination surface, even a long time after its initial deposition on the substrate.

Here, two very different operations must be distinguished, even though they always involve the same adhesive; namely, adhesion to the substrate, and adhesion to the destination surface, all of which must be effective in order to effect joining of the substrate and the destination surface. Currently available solutions to this problem do not give complete satisfaction in all fields of application. For example, it is quite easy to deposit adhesives, called "self-adhesive", to substrates comprising materials that have a regular surface and or excellent planarity. This is true for the paper used in the manufacture of envelopes, in particular, because, when the adhesive is deposited, the paper is placed on a rigid, flat substrate, such as a steel plate, so that its flexibility is translated into an adaptability to this substrate from which it acquires the characteristics. Finally, if the paper is guided and held correctly, it behaves as if it, itself, were rigid and hard. This is also true for materials that naturally have these characteristics, such as glass, metal, synthetic materials, and compact cardboards with correct surfaces.

Thus, in cases where the adhesive is solidly associated with the substrate, later adhesive bonding to the destination surface is nevertheless not assured, because once again the qualities of the adhesive must be maintained over time, and there must be a correct destination surface. Once again, the case of the paper is relatively simple. Since it is both flexible and thin, the destination surface will be perfectly adapted to the adhesive.

In these favorable cases, the problem to be solved is to mask the adhesive so that it will not accidently adhere to other objects and to protect it against the retention of dust and against aging (drying, oxidation, etc). The solution adopted comprises placing a strip incorporating silicones on the adhesive so that this strip adheres only very little to the adhesive. On the other hand, pressure-sensitive adhesives are poorly adapted to materials that are not either regular or rigid or, contrarily, very flexible so that the destination surface adapts to the substrate. A characteristic example of a poorly adapted material is corrugated cardboard, and it is this material that will be used here to explain the invention, although the invention has numerous other applications to various materials.

A sheet of corrugated cardboard substantially has one corrugated side and one "plane" side, although if that side is carefully observed, it is possible even with the naked eye to discern quite well marked depressions. In practice, the sheet of corrugated cardboard most frequently encountered has two plane sides placed on each side of a core that has corrugations or fluting. Naturally, depending on the specific strength desired, a sheet of corrugated cardboard may also be provided with a more complex structure, such as two corrugated cores and three plane surfaces, two outer ones and one inner one separating the two corrugated cores. To simplify the description, it will be assumed here that the shell of corrugated cardboard has one corrugated core and two plane sides.

To apply pressure-sensitive adhesive to such a sheet, a strip of thin material, commonly referred to as "transfer tape", which is impermeable to the adhesive and has low sensitivity to the action of this adhesive, is used. One of the two sides of this strip is coated with adhesive, optionally with the use of a treatment enabling the adhesive to better adhere to one side than to the other. This adhesive/strip combination is stored on spools. At the moment the adhesive is applied to the sheet of corrugated cardboard, the coated strip is unwound. This operation is easy since, in winding the strip in a spiral, the adhesive is located opposite the adhesive-less side of the strip and adheres very poorly there. The strip is applied by its coated face, and the adhesive encounters a material that lends itself to adherence of the adhesive. The sheet/adhesive/strip combination is then stored, transported, distributed, and so forth, until the actual use of the adhesive, which is delayed in time compared with the moment when the adhesive was placed on the strip.

Generally, the sheet of corrugated cardboard is a constituent part of a blank that is intended to form a container. It is, thus, at the instant of closure of the container that the adhesive is needed to join the "substrate" part of the container and the "destination surface" part thereof. To accomplish this, one end of the strip is lifted, such action being permitted because the strip detaches readily from the adhesive while the adhesive continues to adhere to the sheet of cardboard. Thus, the protective strip can easily be removed to expose all the adhesive, which remains solidly joined to the cardboard sheet ("substrate") to which it has been applied.

On the surface exposed by the removal of the strip, the adhesive has maintained its power to adhere so that the cardboard sheet (substrate) can be fixed to another part, also of cardboard (destination surface), by simple contact. Thus, by applying the part carrying the adhesive to a part that does not include it, the adhesive bonding of these two parts is achieved.

However, a coated and treated strip of this kind is quite expensive, both to manufacture and to put in place, so that generally this solution is a remote choice when the final product incorporating the pressure-sensitive corrugated cardboard sheet is intended to be inexpensive. Also, aside from the constitution, per se, of the coated strip, to be effective the placement of the strip requires that the sheet of corrugated cardboard presents a highly regular surface, that is, one not having any deformation.

In the manufacture of a sheet of corrugated cardboard with paper of slight thickness, the outer sheets, which constitute the "plane" sides of the sheet, are applied and glued directly to the corrugated core, and despite all the precautions that may be taken (keeping the sheet taut, guiding it, monitoring the speed of presentation, quality of the adhesive, and so forth), depressions in the outer sheets develop between the crests of two adjacent corrugations. These depressions are sometimes invisible to the naked eye and can scarcely be felt. That this characteristic in the concerned types of corrugated cardboard is well known to those skilled in the art, is evidenced by the fact that, in determining the thickness of a corrugated cardboard, one does not use a simple caliper-type measuring tool. Instead, the parts of the caliper in contact with the two sides of the sheet, the thickness of which is to be measured, must have a sufficiently large surface area to overlie at least two corrugations in order to compensate for the irregularities involved here. For example, French Standard NF Q 03-030 specifies that the engaging parts of the tool in contact with the sheet must each have an area of 10 square centimeters (10 $cm^2$).

"Le collage industriel" [Industrial Adhesive Bonding] by Philippe Cognard and Francoise Pardos, published by L'Usine Nouvelle, Paris, provides the following information on page 12:

ACTUAL CONTACT SURFACE

The contact between the two surfaces of two solids is made only at some points, from the microscopic point of view. Assuming the ease of a liquid moistening a solid, there will be microscopic air bubbles that prevent contact. Hence in these two cases, the actual contact is inferior to the contact proposed and the actual strength will be highly inferior to the theoretical maximum strength.

SURFACE DEFECTS

On a level contact surface, an actual surface will have a force of adhesion value less than that which an ideal regular surface would furnish. This is due to the existence of numerous defects in the actual surfaces.

To make a sheet of corrugated cardboard self-adhesive, it is thus necessary, above all, that it have a surface as regular as possible and that the adhesive strip used itself have very high quality. These factors are incompatible with a low cost price. Even if the corrugated cardboard sheets are manufactured with very thick paper, still a satisfactory result may not be obtained.

Up to now, improved results have been attained by using "double-sided" adhesive strips that include a central tape provided with an adhesive coating on both sides and made of a material to which the adhesive sticks vigorously. Placed on one of the coated sides is a protective strip that is not very sensitive to the action of the adhesive and hence can easily be peeled off. Generally this is a strip of paper or synthetic material incorporating silicones. This combination of the central tape, two layers of adhesive, and the protective strip is wound so that it can be stored in spools.

To make an article (a portion of a box, for example) self-adhesive, a certain length of strip is unwound. The coated side is placed on the object ("substrate"), and the segment unwound is cut to the length that corresponds to the size of the object already shaped. When the strip is of the type that includes a central tape, this tape is thus fixed permanently to the substrate, and the adhesive applied to the substrate will never be uncovered. The combination of substrate, central tape, adhesive, and protective strip is then stored, transported and distributed until the moment when the user is to use the adhesive, for example to close an envelope, by gluing a flap (substrate) to the envelope, per se (destination surface), or to close a container of any other type. To use the adhesive, the user must peel off the protective strip in order to uncover the adhesive located on the outer surface of the central tape. Next, he presses the sheet ("substrate") onto another one ("destination surface"), applying the exposed adhesive to the latter.

An expensive and highly complicated strip of this kind improves the results and, with its high quality, compensates for the mediocre planarity of the sheets of corrugated cardboards. However, better results require the use of very thin paper to make the corrugated cardboard if the fixation of the substrate to the destination surface by the adhesive is to be correct. Hence, consumers are deprived of having the best designed products from the standpoint of cost price because either they have well-performing, but very expensive products or they have inexpensive, but mediocre products.

The present invention overcomes all the above disadvantages and makes it possible to obtain substrates, that is, sheets or panels of any materials, provided with an extended-action adhesive for delayed use of the adhesive, regardless of the quality of the substrates, the regularity or irregularity of the surfaces they have, and the fineness or thinness of the materials used. To this end, the subject of the invention is a method for manufacturing a product comprising a substrate on which an extended-action adhesive and a protective strip are located with a view to postponed usage of said adhesive, characterized in that a substrate is chosen, one side of which that is to receive the adhesive has irregularities; the adhesive is heated up to a temperature at which it is pasty at the limit of the liquid state; it is then conducted to at least one orifice arranged for discharging above a plane on which the substrate is placed; then its ejection is brought about simultaneously with a relative movement between the substrate and the orifice in order that the adhesive is deposited on the substrate in at least one thick and, in particular, continuous strand; the temperature of the deposited adhesive is lowered to increase its viscosity until it is pasty at the Limit of the solid state; a pressure intended to cause the application of the protective tape and a lateral spreading and rolling of the strand over its entire length is exerted upon the pasty adhesive; and optionally, at least one later cutting of the product comprising the assembled substrate, adhesive tape and protective strip is performed.

In other characteristics of this method:

the product is intended to be shaped after placement of the adhesive and protective strip in order to constitute a finished article ready for use by application of the adhesive uncovered by peeling off the protective tape;

the substrate, being made of a relatively rigid material, is subjected to a pressure force localized in the zone where the pouring of the adhesive is to be brought about in order to obtain a softening of the substrate which, in this zone, thus becomes more flexible than initially;

the pressure force is applied to an intermediate tape, the width of which is greater than that of the adhesive after spreading;

the applied pressure force is greater than the elastic strength of the material forming the substrate;

because the material of the substrate has an alveolated internal structure, as in the ease of corrugated cardboard, the fluting of which creates longitudinal cells, the applied pressure force is selected to be capable of compressing the walls of the cells forming braces between two opposite sides of the substrate, but insufficient to completely eliminate the elasticity existent perpendicular to said sides;

because it is employed in premises at ambient temperature, the temperature of the adhesive is lowered simply by the absence of heating and by causing the relative movement between the substrate and the pouring orifice at a speed such that the time elapsed between the deposit of the adhesive and its spreading by pressure corresponds to that required to achieve the desired reduction of temperature;

because it is employed in premises at ambient temperature, and the relative movement between the substrate and the pouring orifice has a given speed, a pressure is exerted on the adhesive at a position remote from the pouring orifice such that the time that elapses between the deposit of the adhesive and its spreading by pressure corresponds to that required to achieve the desired reduction of temperature;

after deposition, the strand of adhesive is subjected to positive cooling means, such as a flow of cold air;

the substrate is of cardboard, or similar material, while a strip of thin material that is impermeable to the adhesive and poorly sensitive to the action of said adhesive is placed on the strand of adhesive previously deposited on the substrate and, in order to spread the adhesive strand on the substrate, a pressure is exerted on the strip;

the substrate is of cardboard, or similar material of great length, that is wound in the form of a spiral with at least one longitudinal adhesive strand deposited simultaneously with the unwinding of the substrate, a strip of thin material that is impermeable to the adhesive and poorly sensitive to the action thereof placed on the strand previously deposited on the substrate and, in order to spread the adhesive strand on the substrate, a pressure exerted on the strip, and this set spirally wound onto a spool with a view to its storage;

the substrate is of cardboard, or similar material of great length that is wound in the form of a spiral with at least one longitudinal adhesive strand deposited simultaneously with the unwinding of the substrate, a strip of thin material that is impermeable to the adhesive and poorly sensitive to the action thereof placed on the strand previously deposited on the substrate and, in order to spread the adhesive strand on the substrate, a pressure exerted on the strip, and this set spirally wound onto a spool with a view to its storage following which, before usage of the adhesive, the substrate is cut into panels intended to constitute blanks, particularly for forming containers;

the substrate is a panel of cardboard, or similar material, with at least one strand of adhesive deposited on said panel from a first edge disposed in relation to a second edge opposite the first edge with a strip of thin material that is impermeable to the adhesive and poorly sensitive to the action thereof placed on the adhesive strand previously deposited on the substrate and, in order to spread the adhesive strand on the substrate, a pressure is exerted on the strip, and this set wound onto a spool with a view to its storage, whereafter, imperfect margins are eliminated, if desired;

the substrate is a panel of cardboard, or similar material, with a plurality of panels delivered, one after another, for treatment in a manner in which a space is allowed to remain between them, at least one strand of adhesive being placed on each panel from a first edge disposed in relation to a second edge opposite the first, a strip of thin material that is Impermeable to the adhesive and poorly sensitive to the action thereof placed on the strand, which strip is continuous and extends from one panel to another across the space that separates them and, in order to spread the adhesive strand on each panel, a pressure is vertically exerted upon the strip to press it against the adjacent panel, and then cutting the strip between the panels performed;

the cutting is performed toward the two opposite edges of each panel;

the cutting is performed between the two facing edges of adjacent panels;

the cutting leaves at least one segment of the strip remaining beyond at least one of the edges of each panel;

the substrate is of cardboard, or similar material, with a strip of thin material, that is impermeable to the adhesive and poorly sensitive to the action thereof, placed on the deposited strand of adhesive, and, to spread the strand of adhesive on the substrate, a pressure is exerted on the strip, with the quantity of adhesive deposited and the magnitude of the pressure exerted on the strip being coordinated in such a manner that, after spreading of the strand, the width that the adhesive occupies on the substrate is not greater than that of said strip;

the substrate is of cardboard, or similar material, with a strip of thin material, that is impermeable to the adhesive and poorly sensitive to the action thereof, placed on the deposited strand of adhesive, and the spreading of the strand is effected only when the reduced temperature, to which it has been subjected after deposition on the substrate, has sufficiently increased its viscosity that its degree of adhesion to the strip of thin material is clearly less than the degree of adhesion that it has with the substrate;

the substrate is of cardboard, or similar material, with the pouring of the adhesive brought about via an orifice that has a cross section and an orientation such that the strand of adhesive deposited by pouring has a substantially circular cross section, with the strip of thin material placed upon the adhesive a certain distance from said orifice, which distance, in association with the temperature to which the adhesive is deposited on the substrate and the speed of relative displacement is coordinated, so that the adhesive strand is squeezable and expandable slightly laterally, following which a strip of thin material, Impermeable to the adhesive and poorly sensitive to the action thereof, is placed on the adhesive strand, and a pressure is exerted on the strip to spread the strand of adhesive on the substrate;

the substrate is of cardboard, or similar material, on which at least one strand of adhesive is deposited, a strip of thin material that is impermeable to the adhesive and poorly sensitive to the action thereof is placed on said strand, whereupon, in order to spread the adhesive strand on the substrate, a pressure is exerted on the strip, and the at least one strand of adhesive is deposited and rolled in sufficient quantity, that the strand, after spreading, fills the encountered substrate Irregularities and presents a plane, continuous surface to the strip of thin material;

the substrate is of cardboard, or a similar deformable material to be compressed at least in the zone that is to receive said adhesive, and at least one strand of adhesive deposited whereupon a strip of thin material that is impermeable to the adhesive and poorly sensitive to the action thereof is placed on said strand and spreads the strand of adhesive on the substrate by a pressure exerted upon the strip;

the substrate is of cardboard, or similar deformable material, wherein a regular recess is made over the entire zone that is to receive and adhesive strand, and at least one strand of adhesive is deposited in said recess, following which a strip of thin material that is impermeable to the adhesive and poorly sensitive to the action thereof is placed on said strand to spread the strand of adhesive in the recess of the substrate by a pressure exerted upon the strip, the depth of said recess being substantially equal to the total thickness of the spread adhesive and the strip of thin material;

the adhesive is heated and made to circulate in a closed circuit conduit with pouring of the adhesive being effected by tapping a fraction of adhesive circulating in the closed circuit conduit;

the adhesive is heated and made to circulate in a closed circuit conduit with the adhesive that circulates in the closed circuit conduit held substantially at the temperature that it must have for pouring, and said pouring being brought about by tapping a fraction of adhesive circulating in the closed circuit conduit;

the adhesive is heated and made to circulate in a closed circuit conduit, with a fraction of adhesive circulating in the closed circuit conduit tapped, the temperature of the tapped fraction of adhesive increased, and the discharge of said fraction then effected.

The subject of the invention is also an apparatus for manufacturing a product comprising a substrate on which an extended-action adhesive and a protective strip are located, with a view to the postponed usage of said adhesive, characterized in that it includes a frame, guides for at least one substrate intended to receive the adhesive, at least one reservoir for adhesive, means for heating said adhesive in the reservoir, at least one conduit extended from the reservoir to at least one orifice, means close to the orifice for controllably plugging and opening the conduit, means for setting said orifice and at least one substrate intended to receive the adhesive into relative motion, means arranged to exert a rolling pressure in a direction substantially perpendicular to a plane in which the substrate intended to receive the adhesive is to be located, and means for removing substrates after the reception of adhesive.

In other characteristics of this apparatus:

it is located in premises at ambient temperature; and the means arranged to exert a pressure and a rolling action are remote from the orifice;

it includes means for positive cooling located between the orifice and the means arranged to exert a rolling pressure action;

it includes means for storage of at least one substrate of cardboard, or similar material, means for storing at least one strip of thin material that is impermeable to the adhesive and poorly sensitive to the action thereof, means for depositing the adhesive on the substrate, means for guiding said strip above the adhesive deposited on the substrate, means for simultaneously pressing the strip onto the adhesive and the adhesive onto the substrate, and means for removal of the set comprising the substrate, the adhesive, and the strip, with a view to storage;

it includes means for supporting at least one spool of substrate of cardboard, or similar material, means for depositing the adhesive, means for unwinding the substrate and causing it to travel past at least one orifice for pouring adhesive, means for storing at least one strip of thin material that is impermeable to adhesive and poorly sensitive to the action thereof, means for guiding said strip above the adhesive deposited on the substrate, means for simultaneously pressing the strip onto the adhesive and the adhesive onto the substrate, means for winding the set comprising the substrate, adhesive and strip into at least one spool, and means for supporting said spool;

it includes means for storing at least one stack of panels of cardboard, or similar material, means for individually picking up and distributing said panels, means for guiding said panels, means for uniform displacement of said panels with a view to their travel past at least one orifice for pouring adhesive, means for depositing the adhesive from a first panel edge to a second edge opposite the first, means for storing at least one strip of thin material that is impermeable to the adhesive and poorly sensitive to the action thereof, means for guiding said strip above the adhesive deposited on each panel, means for simultaneously pressing the strip onto the adhesive and the adhesive onto each panel, means for cutting said strip, means for removing the set comprising the panel, adhesive and strip, and means for depositing each of said sets on top of one another to constitute at least one stack;

it includes means for storing at least one stack of panels of cardboard, or similar material, means for individually picking up and distributing said panels, means for guiding said panels, means for uniform displacement of said panels with a view to their travel past at least one orifice for pouring adhesive, means for depositing the adhesive from a first panel edge to a second edge opposite the first, means for storing at least one strip of thin material that is impermeable to the adhesive and poorly sensitive to the action thereof, means for guiding said strip above the adhesive deposited on each panel, means for simultaneously pressing the strip onto the adhesive and the adhesive onto each panel, means for simultaneously cutting said strip and a small, fraction of the panel near the first and second edges of each panel, means for removing the cut fractions, means for removing the set comprising the panel, adhesive and strip, and means for depositing each of said sets on top of one another to constitute at least one stack;

it includes at least one orifice located above a plane on which a substrate is to be located in order that the adhesive to be poured via said orifice will drop vertically onto the substrate;

it includes at least one orifice of circular cross section and located above a plane on which a substrate is to be located in order that the adhesive to be poured via said orifice will drop vertically onto the substrate in a stream of circular section;

it includes a frame, guides for at least one substrate intended to receive the adhesive, at least one reservoir for adhesive, means for heating said adhesive in the reservoir, at least one conduit extending in a closed circuit from and to said reservoir, a duct of thermally conductive material connected to said conduit and ending in an orifice, which orifice includes plugging and opening means, and wherein heating means are located outside said duct, the apparatus further including means for regulating the means for heating the reservoir and the devices for heating the conduit.

The invention will be better understood from the ensuing detailed description, taken in conjunction with the drawings. It is understood that the description and drawings are given solely by way of descriptive, non-limiting example.

FIG. 5 is a schematic longitudinal section showing the phase of the inventive method that involves the association of a substrate, the adhesive and a protective strip.

FIG. 6 is a schematic cross-sectional view showing the phase of the inventive method that involves the deposit of the adhesive onto a substrate.

FIG. 7 is a schematic cross-section showing the phase of the inventive method that involves the deposit of the protective strip onto the adhesive.

FIG. 8 is a schematic cross-section showing the phase of the inventive method that involves the association of the substrate, the adhesive and the protection strip.

FIGS. 9 and 10 are fragmentary, largely schematic views illustrating one manner of finishing a substrate having at least one line of adhesive provided by the inventive method.

FIGS. 11 and 12 are schematic sectional views showing the association of the adhesive with a substrate of corrugated cardboard having an irregular surface by using the inventive method.

FIG. 13 is a fragmentary schematic view showing a variant of the inventive method in which the adhesive and the protection strip are deposited in a recess, the depth of which substantially equals the thickness of the adhesive and the protective strip.

FIG. 15 is a fragmentary schematic view showing the use of the inventive method for accurately producing a strand of adhesive on substrates In the form of separate panels or plates.

FIGS. 16, 17 and 18 are schematic views showing the ability that the invention possesses for producing continuous or discontinuous adhesive depositions.

Figure 1:
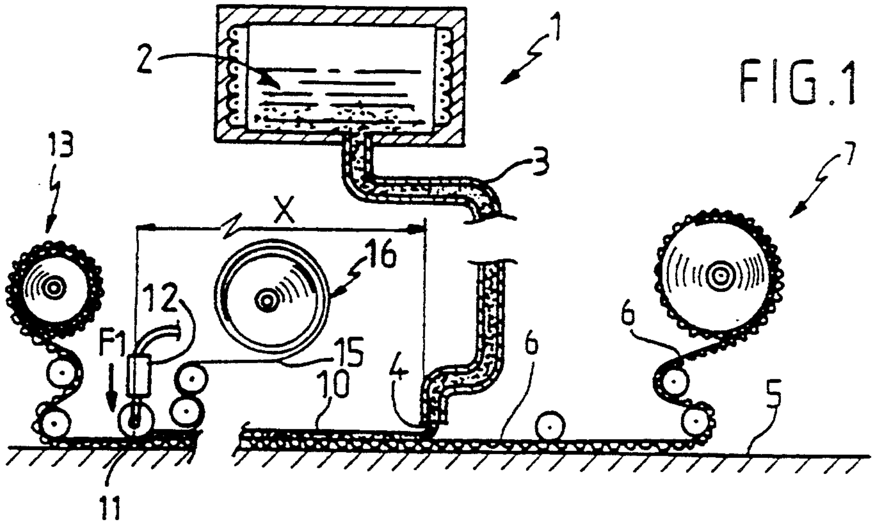
FIG. 1 is a schematic view of an apparatus according to the invention arranged for obtaining sheets of great length having at least one line of adhesive.

Turning now to the drawings, one will see how the method of the invention can be used.

First, in a heated and heat-insulated reservoir 1, a quantity of adhesive 2 is heated to approximately 175° in order to give it a consistency in which it is still pasty, but is at the limit of the liquid state whereby it is able to flow. Via a conduit 3, the adhesive is delivered to an orifice 4 that discharges above a fixed plane 5 on which a substrate is placed.

In the arrangement of FIG. 1, the substrate comprises corrugated cardboard 6 wound on a spool 7. The illustrated material is what is known as a "single-faced" cardboard, that is, one that has a corrugated core associated on only one of its sides with a single sheet forming a surface, or side. The corrugated cardboard f6 is guided by rolls, or the like, to extend over the plane 5 and be displaced by traction (as is known per se) parallel to the plane. As it passes vertically below the orifice 4, the corrugated cardboard 6 receives the heated adhesive 2, which flows from the orifice at a regulated rate so that it is deposited on the cardboard in a thick strand 10.

After deposition, the temperature of the adhesive strand 10 must be lowered, so that its viscosity increases until its consistency is still pasty but at the limit of the solid state. In the description, it is assumed that the premises in which the method is performed are at ambient temperature, and the lowering of temperature of the adhesive is obtained simply by the absence of heat and by adjusting the speed of displacement of the corrugated cardboard 6 with respect to the fixed support 5.

When the strand 10 has gained the desired consistency, a pressure is exerted upon it sufficient to cause its lateral spreading perpendicular to the direction of its displacement, and its rolling over its entire length parallel to the direction of its displacement. This pressure is effected by a roller 11 associated with a jack 12 that urges it in the direction of the fixed support 5, as indicated by the arrow F1. Thus the strand 10 is compressed so that, finally, it has only a very slight thickness compared with the thickness it had before undergoing the pressure of the roller 11 controlled by the jack 12.

The set comprising the corrugated cardboard 6 and adhesive 2 is then wound in a spiral onto a spool 13. This comprises one form product according to the invention. Since this product is a winding of corrugated cardboard provided with a strand of adhesive 10, it is a semi-finished product, which can be fashioned in any desired manner by printing, cutting, grooving, folding, fashioning into a three-dimensional object, etc. The adhesive may be used either on the occasion of this fashioning or later, for example for closing the finished article in the ease where It is a container (box, small chest, small ease, envelope, etc.).

It is understood that the adhesive 2, 10 is always active, since it is intended to be used later, but it must be isolated from the outside to keep it from becoming soiled and to prevent the cardboard to which it adheres from accidentally sticking to other objects. For this purpose, a protective strip 15 is provided, which is unwound from a spool 16 and is guided above the adhesive strand 10 until it is pressed by the roller 11. Thus, the adhesive strand 10 is not crushed directly, but rather with the interposition of the protective strip 15.

To obtain the intended temperature and hence the intended viscosity, not only the speed of displacement of the corrugated cardboard 6 but also the distance X measured between the orifice 4 and the axis of the roller 11 must be taken into account. The higher the speed, the greater the distance X must be. To combine a major displacement speed with small distance X, the adhesive strand 10 must be subjected to positive cooling means (not shown), such as a flow of cold air or to a cooling duct.

Figure 2:
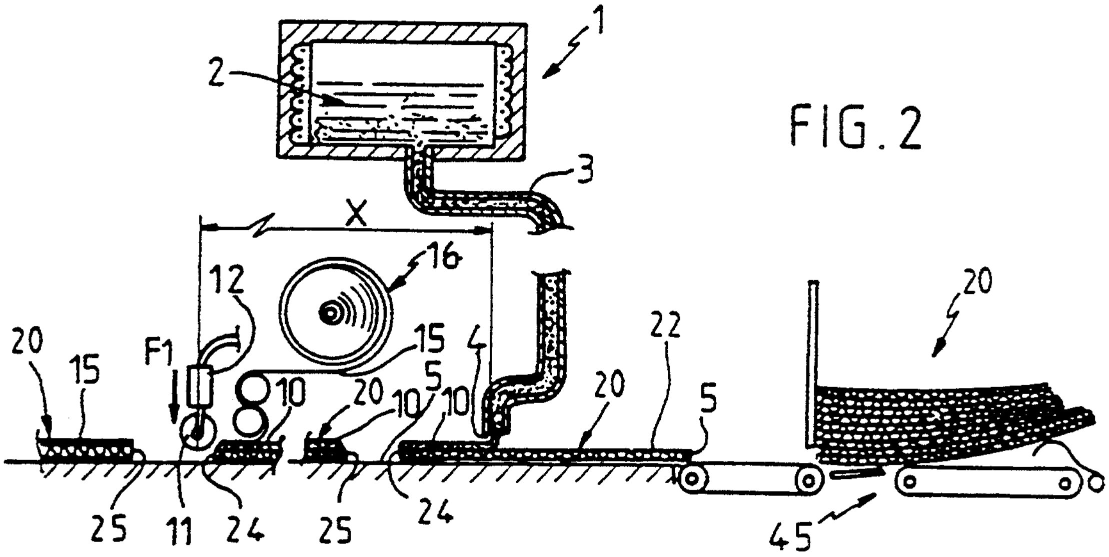
FIG. 2 is a schematic view of an apparatus according to the invention arranged for obtaining panels or plates that have at least one line of adhesive.

In FIG. 2, a variant is shown in which the substrate is not continuous over a great length but, instead, comprises individual successive panels. The same elements as those of FIG. 1 have the same reference numerals. Operations common to both variants will not be described below because they have already been explained.

The panels 20 are, for example, of "double-faced" corrugated cardboard, that is, they are obtained by cutting a sheet of corrugated cardboard that includes a corrugated core and one sheet on each of both sides, so that it has two plane sides or faces. Containers of a relatively low price, particularly for mail or messenger shipments, are generally made from a material of this type. The panels 20 are stored in a stack from which they are extracted, one at a time, in order to be carried individually underneath first the orifice 4 and then the pressure roller 11.

It is well for the pouring of adhesive 2 via the orifice 4 to be brought about as soon as the downstream edge of each panel 20 arrives at a position vertically beneath this orifice 4, and for the stream of adhesive 2 exiting from the orifice 4 to be interrupted as soon as the upstream edge of each panel 20 arrives at the position beneath the orifice 4. (The words "upstream" and "downstream" must be interpreted in terms of the direction in which the panels 20 are displaced relative to the fixed support 5.) If the adhesive 2 flowed continuously, it would be deposited, not only on the panels 20, but also on the support 5 which is exposed between the panels 20. Since each panel 20 is individualized, it is provided here that each protection strip 15 is interrupted between two successive panels 20 by a cut made as close as possible to the upstream and downstream edges of each panel 20. This is the embodiment shown in FIG. 2, where panels 20 have been intentionally shown in various positions, along with the manner in which the roller 11 is withdrawn.

It is thus seen that the downstream edge of the panel 20, which is located under the coil 16, receives one end of the strip which has been cut adjacent the upstream edge of the panel 20 by a cutter positioned slightly to the left of the roller 11. The ends of the strip 15 at the beginning and end of the strand 10, near the downstream and upstream edges of the panels 20, may then be less regular than its central zone. How these irregularities can be eliminated are explained hereinafter.

As has been explained above, the essential problem of an adhesive for postponed use arises due to the fact that the destination surface often differs from the substrate surface. Hence, it is necessary, for joining the substrate and the destination surface, for the adhesive to be equally effective for one as for the other. How an adhesive can be applied so that is well anchored on a substrate, despite surface irregularities of this substrate, has just been shown above. Now, means with which it can be assured that the adhesive, thus placed, will be effectively fixed later onto a destination surface, in order to durably join the substrate and the destination surface, will be described.

It will be recalled that the present invention makes possible solving the most difficult problem in this field, that is, that in which a substrate and a destination surface have surface irregularities. Recalling this, it must also be stressed that an important factor to be taken into consideration is the adaptability to one another of the substrate and the destination surface. For example, it has been found that this problem is even more difficult to solve with an article of high-quality corrugated cardboard because, as the quality of the corrugated cardboard increases, it becomes more rigid. However, its rigidity does not mean that the irregularities have disappeared. On the contrary, the product has even more defects. Irregularities are still present and, moreover, the substrate and the destination surface are incapable of adapting to one another. This phenomenon will be better understood if, by exaggeration, one compares corrugated cardboard with corrugated sheet metal, because it can easily be imagined that it would be impossible to glue two corrugated sheets together unless the corrugations were strictly encased, the contact surfaces otherwise being minimal in extent and therefore, all the weaker since neither of the two sheets would be capable of adapting to the corrugations of the other by deformation of its own corrugations.

It will be understood, conversely, that if at least one of the sheets were deformable, for instance if it were of rubber, or if a deformable joint were placed between them, the contact surfaces would be increased disproportionately, and finally a correct joinder would be assured regardless of the orientation of the sheets with respect to one another (parallel corrugations, or more or leas intersecting corrugations), and regardless of the crosswise offset between presumably parallel corrugations.

Now, by adapting these explanations to the more subtle case of a substrate and a destination surface having surface irregularities, it will be understood that the more rigid the elements present, the poorer are the probabilities of correct adhesion, even though it is assured that the adhesive is correctly anchored on the substrate at the time the adhesive is put in place in the factory. If, despite this, a rigid substrate and destination surface are chosen, the invention provides for lessening this rigidity in the zone where the adhesive is to be placed.

Figure 3:
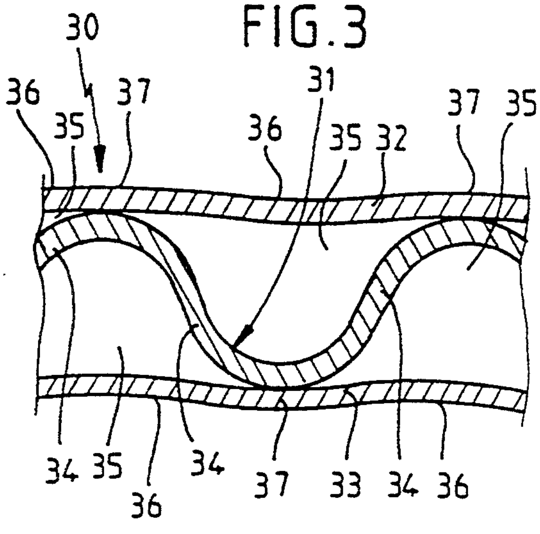
FIGS. 3 and 4 are schematic views showing one phase of the inventive method and providing for preparation of the substrate prior to placement of the adhesive.

In FIG. 3, a section through a corrugated cardboard substrate 30 is seen which, being assumed to be of high quality, is made of long-fiber, heavyweight paper. It has a core 31 of corrugated paper glued to two opposed outer faces or sides 32 or 33. The parts 34 of the core 31 that extend between the sides 32 and 33 define longitudinal cells or channels 35 and constitute the same number of braces that lend great rigidity and strong crushing strength to the substrate 30. Finally, the sides 32 and 33 are very easily deformable, and their surface irregularities, that is, recesses 36 and bosses 37, are definitively shaped. Except for the scale, pressing one side 33 against a side 32 to glue them together amounts to attempting to glue the ridges on two corrugated metal sheets together.

According to the invention, the substrate 30 is prepared with a view to its gluing to a destination surface, even before the product has been completely finished. To do this, a pressing means, such as a roller 38, mounted for rotation on a shaft 39 and urged in a direction perpendicular to the planes of the sides 32 and 33, is used in order to compress the parts 34 forming braces to weaken them but, contrarily, without eliminating all the elasticity between the two opposite sides 32 and 33.

Figure 4:
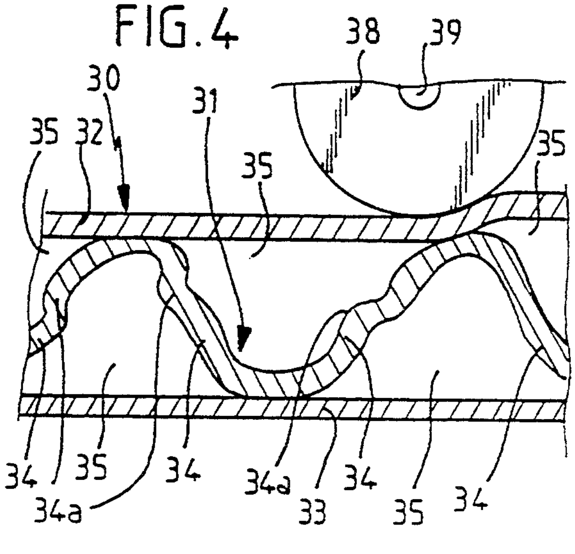

It can be seen in FIG. 4 that the parts 34 are deformed and have creases 34*a*, because of which the substrate 30 becomes elastic instead of being rigid. It is upon this elastic zone that the adhesive will be deposited. Moreover, to assure gluing at the time the adhesive 10 is used, a pressure is exerted (generally by hand) on the side opposite that having the adhesive 10. If the adhesive has been applied to one side 32, then pressure will be exerted on the opposite side 33. If the substrate 30 is very rigid, the force is insufficient to deform the side 32. With a substrate 30 of the type shown in FIG. 4, the manual pressure exerted on one side will be transmitted to the opposite side, enabling it to deform and consequently adapt to the irregularities of the destination surface.

It should be noted that the force of the roller 38 retards the displacement of the substrates 30. To avoid any irregularity in motion, it is preferred that a positive drive of the substrates, for example by means of belts or rollers with pins, be provided. However, according to the invention, the roller 38 itself can also be used to drive the substrates by providing such positive drive be means of a back-geared motor of a known type (not shown). The ability of the roller 38 to drive the substrates 30 may be enhanced by providing its surface in contact with the substrates 30 with bumps, such as for example, by knurling it, as is known per se.

The flexibility imparted to the substrate 30 due to the creases 34*a* is operative only subjacent the adhesive 10, such that, the formation of the creases 34*a* constituting weakening of the material is limited only to the zone where the adhesive 10 is located, and consequently in no way impairs the mechanical strength of the entire substrate 30. However, it is preferred that the softening of the substrate 30 created by the roller 38 extend along a strip somewhat wider than the width occupied by the adhesive 10 when it is deposited and spread in order to assure that the manual pressure exerted on the opposite side is largely transmitted to all of the adhesive.

FIG. 5, on the one hand, and FIGS. 6–8, on the other, are schematic views on a larger scale than the preceding drawings, making it possible to show clearly the characteristics of the invention. With particular reference to FIG. 5, while the adhesive strand 10 extends the distance X along the substrate 20, it cools and sets, the heating of the adhesive 2 in the reservoir being adjusted so that, at the outlet of the orifice 4, it will have a consistency such that it will deform by sagging. The orifice 4 has a circular cross section such that the strand 10, when it is deposited, will itself have a circular cross section (see FIG. 6). However, when the adhesive strand 10 meets the substrate, it cannot physically maintain this theoretical cross section, and it naturally tends to flatten. With increasing distance from the orifice 4, therefore, the strand 10 tends to become wider and not so high (FIGS. 5 and 7).

When the strand 10 has achieved a flattened condition (FIGS. 8 and 9), it presents a not-insignificant surface area to the protective strip 15, and since the adhesive 2 is chosen for its extended action, sufficient adherence is obtained between the strand 10 and the strip 15 to avoid any mutual sliding. This arrangement is important because it allows quite high travel speeds despite the resistance presented by the strip 15 wound around the spool 16 when traction is exerted upon it.

After the action of the roller 11, the strip 15 is located on the adhesive 2, which no longer has the shape of a thick strand but has become a thinner and wider strand (FIG. 8). The quantity of adhesive 2 delivered via the orifice 4 is arranged so that, after the action of pressure by the roller 11, the adhesive strand 10 will have a width no wider than that of the protective strip 15.

The substrate 20 of FIGS. 2, 5, 9 and 10 includes a corrugated core 21, as well as two, so-called, plane sides 22 and 23. Reference numeral 24 indicates the downstream edge of the panel 20, and reference numeral 25 indicates its upstream edge. It can be seen in FIG. 5 that the adhesive strand 10 and the protective strip 15 are substantially aligned with the downstream edge 24. On the other hand, in FIG. 9, it can be seen that the adhesive strand 10 has a somewhat irregular width, due to the flow characteristics of the adhesive 2 outside the orifice 4. Such flow cannot immediately provide the intended width, contrary to what is obtained in the prior art with orifices located in contact with the substrate to be coated, and that deliver an adhesive of very thin cross section in its quasi-definitive form of a coating layer. Such orifices are known as "lip nozzles". The same phenomenon of irregularity occurs in the vicinity of the upstream edge 25, when the flow of adhesive 2 is interrupted.

In FIG. 5, it can be seen that the flow time can be adjusted such that the strand 10 will be interrupted just short of the upstream edge 25, because the rolling action exerted by the roller 11 tends to lengthen the adhesive strand longitudinally within the last few millimeters of the panel 20, and this should be taken into account so that the adhesive will not be spread beyond the panel 20.

If the protective strip 15 has the same width as the adhesive strand 10, the arrangements of FIG. 9 in the vicinity of the two downstream and upstream edges 24 and 25 are acceptable, because the absence of gluing of the protective strip 15 makes it possible to grasp it easily by its end when one wishes to peel it off in order to apply the substrate to the destination surface. However, by suitably adjusting the degree of adhesion of the strip 15 and adhesive 10, easy removal of the strip 15 can be achieved without requiring the provision of these not very attractive arrangements.

It is even less desirable when the protective strip 15 is wider than the adhesive strand 10, as has been shown in FIG. 9. This is why, in one characteristic of the invention, when the panels 20 are intended to be cut later, the imperfect margins are removed so that only the central zone of the adhesive strand 10, having the width intended, will remain. To this end, the substrate 20 is cut along the lines 26 and 27 (FIG. 10). FIG. 9 shows the path of the cutting line 26 to illustrate that, at most, it passes close to the imperfect end of the adhesive strand 10. FIG. 10 shows the two oblique and symmetrical cutting lines 26 and 27, which lend the panel 20 a very attractive quality in terms of appearance and finish.

In certain cases, it may be necessary to finish the panels 20 by removing a more or less wide border all along both the downstream and upstream edges 24 and 25. This cutting has the advantage of removing any imperfect margins. In that case, clearly, the lines 26 and 27 can no longer be oblique but, instead, are located in the extension of the downstream and upstream edges 24 and 25.

Preferably, the pressure force exerted by the roller 11 should be carefully adjusted so as to obtain, not only compression of the adhesive strand 10 but also an effect of rolling. That is, the roller 11 should not follow the irregularities of the substrate 20 but, instead, should remain at a constant distance with respect to the nominal level of the plane 5. In this way, it is assured that the upper face of the adhesive strand 10 will be beth continuous and planar. This feature is shown in FIGS. 11 and 12. FIG. 11 shows a substrate panel 20 on which an adhesive strand 10 has been deposited, as indicated above, transversely relative to the corrugations of the core 21. It can be seen that the outer sides 22 and 23 are not absolutely planar but, instead, have depressions facing the concave portions of the core 21. These irregularities are sometimes difficult to perceive with the naked eye, but they are sufficient to make the proper placement of adhesive directly onto the cardboard in an economical manner practically impossible.

Tests have shown that placement of the adhesive on such a substrate, by using the method of the invention, produces an adhesion surface area greater than that obtainable with a "lip nozzle" of the known type, while depositing the same quantity of adhesive. The mason for this is that, with a "up nozzle" the adhesive is deposited continuously over the substrate, but upon fixation thereof to the destination surface, only the crests of the irregularities, that is, the portions in facing relation to the convex corrugations, make contact. This result is not satisfactory because the object sought is not only to deposit adhesive on a substrate. It is, above all, to enable this adhesive to later join the substrate and the destination surface quickly, sturdily, and durably. Since the probability is high that the concave irregularities of the substrate will be located precisely facing concave irregularities of the destination surface, and the adhesive fragments will be facing concave irregularities, the effectiveness of the adhesive bonding is then uncertain. It is also uncertain that the fixation may hold for several hours only, with the assembled parts becoming detached from one another because the reduced amount of surface area of adhesion produces a lower resistance to the forces and strains upon the assembled parts.

In FIG. 11, it can be seen that the adhesive strand 10 has a thickness E facing the concave irregularities and also has a thickness facing the convex irregularities. Its outer face 10*a* is planar and continuous. FIG. 12 shows the same characteristics in the case where the adhesive strand 10 is parallel to the corrugations of the core 21, rather than perpendicular thereto.

According to the invention, therefore, the adhesive fills the concave irregularities and also covers the convex irregularities with a strand of significant thickness for the later fixation of the substrate to the destination surface, regardless of the irregularities present in the destination surface, because the adhesive has a surface that is beth continuous and planar.

In the prior art, the negative effects of insufficient adhesive cannot be combated except by improving the state of the surfaces present, in particular by choosing thick, long-fibered paper, which has a high cost. The invention overcomes this disadvantage, because it allows the choice of thin, inexpensive paper. In this respect, it is known that panels 20 may often have sides 22 and 23 of different qualities. For the sake of rationalization, a paper of good quality, with long fibers, is chosen for the side intended to be located outside the completed cardboard article (such as a container), while a more ordinary paper, with short fibers, such as recycled paper, is chosen for the side intended to be located on the inside and hence not visible. The adhesive 2 must be precisely deposited in the inner, ordinary side (substrate), which is intended to be affixed to the outer, higher-quality side (destination surface). Thanks to the invention, conventional methods for quality selection can hence be adopted without fear of creating an adhesive bonding defect.

The added thickness created by a strand of adhesive 10 and its protective strip 15, which are located asymmetrically, has disadvantages for storage in a spool 12 of corrugated cardboard 6 (FIG. 1) or for stacked storage of panels 20. Either the spool 13 becomes frustoconical instead of cylindrical, or the panels 20 are askew instead of being properly flat. To avoid this disadvantage, the invention provides creation of a recess initially along the entire location of the adhesive strand 10 to a depth equal to the total thickness of the adhesive strand. The required operation is easy to perform when the substrate is of corrugated cardboard because this is a quite soft material that deforms readily. Such operation, for the exemplary embodiment of the invention in which the substrate is a panel 20, is described hereinafter.

A recess or furrow 28 is formed upstream of the orifice 4 and may be obtained by means of a roller 14 driven to rotate and subjected to a pressure force aimed perpendicular to the side 22 of the panel 20 in order to obtain bending of the corrugations of the core 21, as has been schematically shown in FIG. 13.

Control of the temperature of the adhesive 2 deposited on the substrate is very important, since this temperature determines the consistency of the strand 10 and a good flow of the method of the invention. If one were to proceed as simply as the diagram in FIGS. 1 and 2 suggests, one would risk having an inadequate adhesive temperature at the orifice 4, due in particular to the lowering of temperature in the conduit 8. A first precaution is, accordingly, to heat-insulate the conduit 3 in order to avoid excessive temperature drops. However, this may prove inadequate and, according to the invention, a closed circuit is preferably created in which the adhesive 2 is made to circulate, originating in the reservoir 1 and returning thereto. This circuit is thus kept at a known, stable temperature. Also, the flow of the adhesive 2 via the orifice 4 is brought about by tapping into this circuit, and the adhesive is reheated up to the immediate proximity of the orifice 4 to obtain the intended temperature with great precision (on the order of a few degrees celsius).

For employment of the invention, a non-aqueous adhesive can advantageously be used, so that it will not be absorbed by the substrate when the substrate is hydrophilic, as is the ease with cardboard. An example of such an adhesive is styrene-isoprene-styrene, without the addition of solvents, having a viscosity on the order of 10,000 centipoise.

Figure 14:
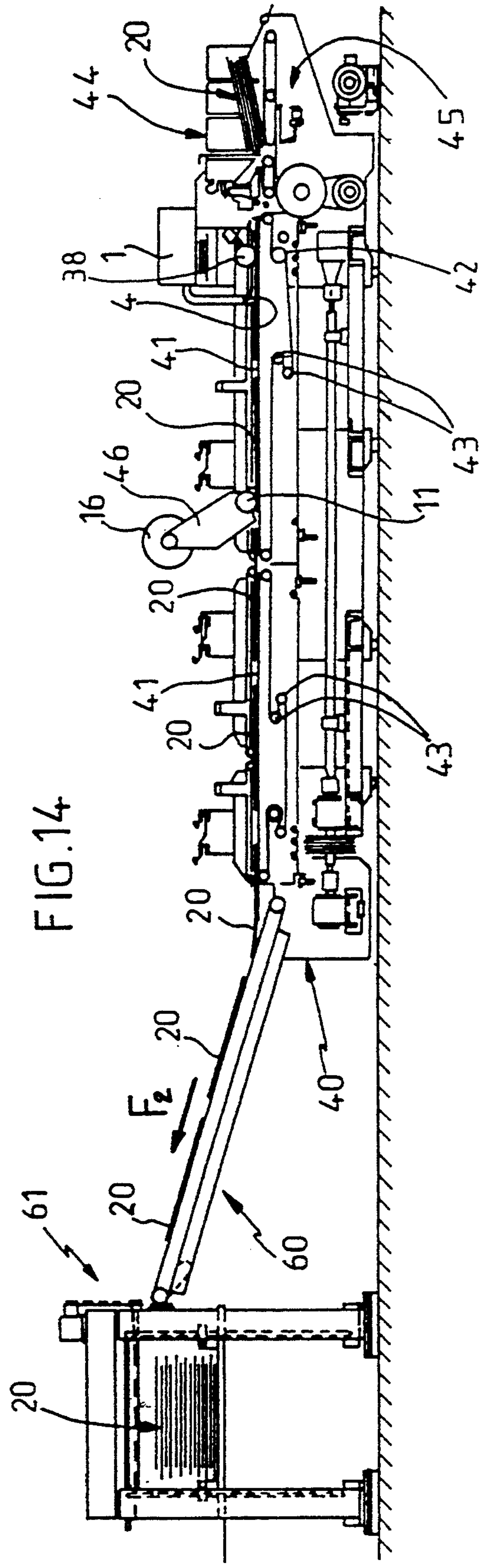
FIG. 14 is a schematic longitudinal section of a machine according to the invention for practicing the inventive method on an industrial scale.

Turning now to FIGS. 14 and 15, an apparatus for performing the invention can be seen, comprising a complete machine that assures the basic functions (such as panel feeding) and the functions specific to the invention. As the basic functions of the mechanism are known to one skilled in the art, their description will be limited to that needed for comprehension of the invention.

The machine includes a frame 40, guides for belts 41 which, together, comprise a means for translation of the substrates 20 with respect to the machine, per se. The belts 41 are supported at all the locations where they undergo pressure forces (beneath rollers 11 and 14, in particular). The plane on which the panels 20 are placed is here constituted by the set of translation belts 41. These belts are engaged by driving pinions 41 and tension pinions 43. Located at one end of the machine is a mechanism 44 of a known type, known as a "layer-on", containing a stock of stacked substrates 20 and including means 45 for feeding these substrates 20 sequentially to the belts 41 that drive them toward the other end of the machine. The reservoir 1, the orifice 4, and a device 46 assuring feeding of the protective strip 15 and the actuation of the pressure roller 11 are located above the bolts 41.

The general operation of this apparatus is as follows. The panels 20 are fed by the mechanism 45 and are taken on by the belt 41, associated in a known manner with counterpart belts, that together assure holding and translation of each substrate 20. As soon as the downstream edge 24 of a panel 20 is located vertically beneath the orifice 4, a detector 50 (FIG. 15) causes adhesive to flow via the orifice 4 until another detector 51 (FIG. 15) senses the arrival vertically beneath it of the upstream edge 25 of the panel 20. This detector 51 then causes termination of the flow of adhesive via the orifice 4. Another detector 52 (FIG. 15) initiates feeding of the protective strip 15 as soon as the upstream edge 24 of the panel 20 approaches the pressure roller 11. As explained above, the strip 15 adheres to the adhesive strand 10 that has been deposited and is pressed with it by the roller 11. As soon as the upstream edge 25 of the panel 20 arrives at a prescribed position, another detector 53 (FIG. 15) causes the transverse cutting of the protective strip 15, and, as applicable, the termination of the operation of the mechanism (not shown) for unwinding and delivering the strip 15. The panel 20 is then deposited on an inclined conveyor 60, which carries it, as indicated by the arrow F2, toward a mechanism of a known type known as a "stacker" 61, on which the panels 20 accumulate until they reach a certain level. When the prescribed level is reached, the entire stack is removed for storage of the panels 20, either with a view to their shipment as is, or with a view to additional operations, in particular to make blanks intended to form containers.

A panel 20 provided with an adhesive strand 10 and a protective strip 15 comprises another form of product according to the invention. This is a semi-finished product, which can be fashioned in any desired manner, as for example, by printing, cutting, grooving, folding, conversion into a three-dimensional article, and so forth. The adhesive may be used on the occasion of this fashioning, or later, for example for closing the finished article if it is a container (box, small chest, small ease, envelope, etc.).

When the machine is furnished with rigid panels, such as the panels 30 of FIGS. 3 and 4, then the roller 38 is used, which is located between the layer-on 44 and the orifice 4. Thus, the zone of softening on the panel is created just before the adhesive 2 flows onto it from the orifice 4. The pressure that the roller 38 exerts is advantageously adjustable, so that the machine can be used with substrates of different rigidity, requiring variable pressures. This can be attained, as is known per se, by means of a jack (not shown), the rod of which acts on the shaft 39. If the substrates used are not very rigid and do not require softening, the roller 38 is neutralized.

FIG. 15 illustrates the coordination of the various specific functions of the machine in an embodiment particularly well adapted to controlling the flow temperature of the adhesive. The reservoir 1 is associated with an external closed circuit including the conduit 3 and a return 70 on which there is a pump 71. The reservoir 1 is surrounded by an electrical heating resistor 72 protected by a heat-insulation casing 73. A conduit 74 ends in the orifice 4 and is connected to the return line 70 in closed circuit 3, for which it constitutes a duct that holds an electric valve 75 of the "all-or-nothing-type", and that, in operation is either fully open or fully closed. The duct is surrounded with a heating resistor 76 protected by a heat-insulation casing 77 up to the immediate proximity of the orifice 4.

During the entire operation of the machine, the resistor 72 is powered, and a thermostat 80 associated with a relay contact 81 controls this power to keep the mass of adhesive 2 in a pasty form, at the limit of the liquid phase and at the proper temperature. The pump 71 assures the permanent circulation of adhesive 2 to avoid the establishment of a temperature gradient between the upper and lower layers of adhesive 2. The result is, accordingly, a stable temperature of the entire mass of adhesive 2, to a virtually complete extent.

The detector 50 is positioned such that it detects the downstream edge 24 of a panel 20 sufficiently early so that the adhesive 2, which is substantially liquid, flows at the proper temperature as soon as the downstream edge 24 is beneath the orifice 4, taking the following parameters into account.

The detector 50 actuates the electric valve 75, which causes the expulsion of adhesive 2 outside the closed circuit and its flow via the duct 74.

The duct is heated by the resistor 74 in order to give up heat to the adhesive 2 that is flowing. For this reason, the duct is preferably made of a heat-conductive material.

The temperature to which the duct 74 is brought, and its length, are established so as to obtain the intended temperature for the adhesive 2 at the orifice 4, within one or two degrees Celsius.

The detector 51 is positioned such that it causes the closure of the electric valve 75 in time so that adhesive 2 will no longer flow beyond the downstream edge of the panels 20, taking into account the length of the duct 74, the contents of which continue to flow after the electric valve 75 has been closed.

Additionally, the bidirectional jack 12 is supplied with fluid under pressure via two conduits (only one of which, 82, is schematically shown to simplify the drawing, this mechanism being within the competence of one skilled in the art to embody). The conduits 82 are controlled by at least one electric valve 83. The control of this electric valve 83 is effected by a feeler (not shown) which is either preadjusted or slaved to parameters taking into account the intended thickness of the adhesive strand 10, the quality of the cardboard, the irregularities of its sides, and so forth.

The mechanism 46 is not described in detail, because it may be of various known types that are more or less complex and consequently include more or less numerous command, guide and control devices. Its control has been schematically represented generally by an electric valve 84.

The electric valves 83 and 84 are slaved to the detectors 52 and 53, so that the delivery of protective strips 15 and the distance between the roller 11 and the surface of the panels 20 will be constantly monitored and coordinated with the presence and absence of panels 20 on the belts 41 in the location in question. The electric circuit is connected to a source of current 85 and includes a master switch 86. The heating resistor 76 is adjusted by a thermostat 87 which controls a switch 88. In actual practice, this schematic circuit is naturally more complex, in particular because it is combined with circuits and electronic components.

The use of the invention does not require that the strand of adhesive be continuous. In FIG. 16, a continuous strand of adhesive 10 has been schematically shown, but other solutions are shown in FIGS. 17 and 18. FIG. 17 illustrates one example in which the strand of adhesive is made up of the juxtaposition of three narrow strands 10*a*, 10*b* and 10*e*. Hence, the strand is discontinuous in terms of its width, but on the other hand each of these strands is continuous longitudinally.

FIG. 18 shows an example in which the strand of adhesive is made up of the juxtaposition of points 10*d* disposed in longitudinal and transverse lines. They may also be disposed in longitudinal lines but staggered, for example, in a zig-zag pattern in the transverse direction. Hence, the strand is discontinuous both longitudinally and transversely.

If a discontinuous strand is employed, then the total quantity of adhesive must remain substantially the same as that for a continuous strand 10 in order to obtain good fixation of the substrate to the destination surface. This means that a discontinuous strand of the type shown in FIG. 17 or FIG. 18 has a total width greater than that of a continuous strand 10 such as that shown in FIG. 16.

The adhesive, put in place in the factory prior to shipment to the customer, may be deposited directly on the final product and is masked by the protective strip, which may be any color, including white, and may have an attractive appearance. The invention is accordingly readily applicable not only to articles made or tan corrugated cardboard, but also to articles of white corrugated cardboard, or other material.

Figure 19:
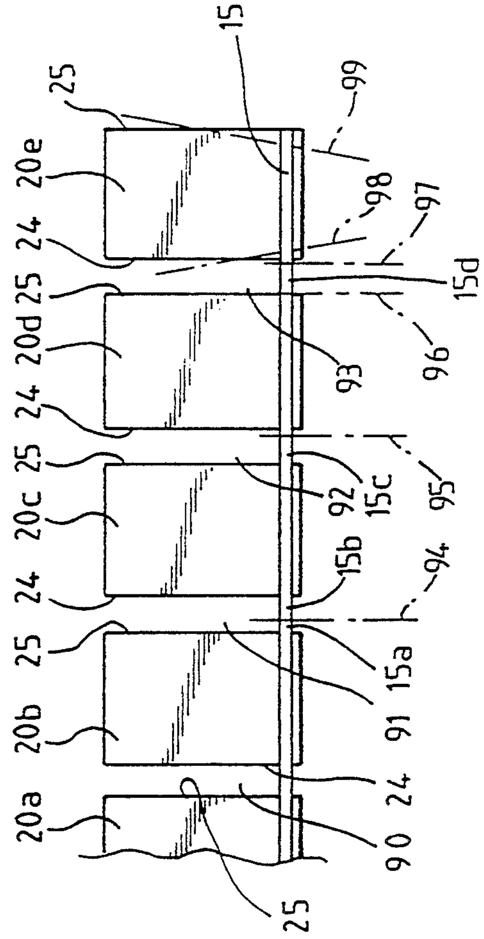
FIG. 19 is a schematic view illustrating a variant of the invention in which the substrates are separate panels while the protective strip is continuous.

Turning now to FIG. 19, it can be seen that separate, and hence discontinuous panels and a continuous protective strip can be used simultaneously. Five panels 20*a*, 20*b*, 20*e*, 20*d* and 20*e* and one continuous protective strip 15 have been schematically shown, the protective strip consequently passing through the spaces 90, 91, 92 and 93 that separate two successive panels 20. To make individual products comprising a panel 20, an adhesive strand 10 and a protective strip 15, the protective strip must be cut. In practice, the cut is made between two panels 20 immediately after the strip 15 has been affixed to the second panel. The diagram in FIG. 19, accordingly, does not correspond to this hypothesis, but it has been retained despite this because it makes simpler to understand the various possibilities for cutting that will now be described.

The strip 15 that passes through the space 90 between the panels 20*a* and 20*b* is intact, that is, it has not been cut. Substantially at the level of the space 91 between the panels 20*b* and 20*c*, there is a dot-dash line 94, which indicates a straight cut transversely of the strip 15, which, when repeated in each space, leaves two tongues 15*a* and 15*b*. Each completed panel 20 then has two tongues, the tongue 15*a* on the side of its upstream edge 25, and the tongue 15*b* on the side of its downstream edge 25. The presence of these tongues may be desired to facilitate peeling off of the protective strip 15 when the adhesive strand 10 is to be used by enabling the user to grasp whichever of these two tongues seems most convenient to him.

Substantially toward the downstream edge 24 of the panel 20*d*, which is a boundary of the space 92 between the panels 20*e* and 20*d*, there is a dot-clash line 95, which indicates a straight cut that is performed transversely of the strip 15, closely adjacent the edge 24. This cut may be repeated for each space to leave a single tongue 15*c*. Each completed panel 20 then has a single tongue 15*c* on the side of its upstream edge 25. The presence of this tongue may be desired to make it easier to peel off the protective strip 15 when the adhesive strand 10 is to be used, but here the user no longer has a choice between two tongues. On the other hand, the tongue 15 is longer (by practically twice) than each of the tongues 15*a* and 15*b*, which may make it easier to peel off the strip 15.

Substantially toward the two upstream and downstream edges 24 and 25 of the panels 20*d* and 20*e*, which define the space 93 between the panels 20*d* and 20*e*, there are dot-dash lines 96 and 97, respectively, each of which indicates a straight cut transversely to the strip 15, which when repeated for each space, does not leave any tongue remaining but rather a fragment of the strip 15*d*, constituting a scrap to be discarded. The completed panels 20 now, accordingly, have no tongue at all. This solution may be desired if the products, thus obtained, are intended to be fashioned mechanically afterward, because the presence of one or two tongues may be inadvisable, or even prohibited, if they present the risk of catching in mechanical moving parts, for example, and hence of impeding machine function.

In all eases, however, the embodiment that has just been described in conjunction with FIG. 19 may be preferable if high machine output is sought. In fact, the placement of a strip segment 15 for each panel 20 means that a relatively slow production speed must be tolerated, because the first few millimeters of the strip 15 must be allowed time to adhere to the adhesive strand 10. By placing the strip 15 continuously, there is only a single leader at the onset of production, and there is no longer any fear of detachment of the strip 15 even at high speed because the strong traction that, as a result, is exerted on strip 15 to unwind it from the spool is balanced by a considerable resistance to detachment because the strip continuously extends over the length of two panels 20. This increase in production can largely compensate for the increase in the quantity of strip 15 consumed. Furthermore, since the strip is retained by the adhesive strand 10 of two successive panels, the intensity of the adhesive bonding may be reduced, which allows the use or inexpensive strips 15 and makes It possible to peel of this strip 15 more easily at the time the adhesive strand 10 comes to be used.

We claim:

1. An apparatus for producing a substrate having an extended action adhesive for delayed use thereof, said apparatus comprising:

a frame;

a reservoir for containing heated adhesive in a flowable state operably positioned with respect to said frame;

adhesive supply means including a discharge orifice extending from said reservoir;

means for establishing relative movement between a substrate and said adhesive discharge orifice;

means for controlling the discharge of adhesive as strands on onto said substrate extending longitudinally in the direction of movement of said substrate;

means for cooling said adhesive strand on said substrate to decrease the adhesion properties of its the exposed surface of said strand;

means for dispensing a thin protective strip onto said strand downstream of said orifice, said strip being substantially coextensive with said strand and formed of material which is substantially impermeable to the adhesive and poorly sensitive to the action thereof;

means for applying pressure simultaneously to said protective strip and to said adhesive strand following cooling thereof of said strand for spreading the adhesive across with respect to said substrate; and means for removing said substrate from said frame following reception of said adhesive.

2. The apparatus of claim 1 in which said pressure-applying means comprises a rotatable roller having an axis of rotation substantially perpendicular to the length of said strip operably positioned with respect to said frame for engagement with said protective strip adhesive strand to press it and said strand in the direction of said substrate.

3. The apparatus of claim 2 including means for adjustably positioning said roller with respect to said frame for varying the pressure applied to said adhesive strand.

4. The apparatus of claim 2 in which said roller comprises a substantially cylindrical body mounted for rotation with respect to said frame; and means forming knurling on the circumferential surface of said body.

5. The apparatus of claim 4 including means for rotatably driving said roller body.

6. The apparatus of claim 1 in which said discharge orifice and said pressure-applying means are disposed in longitudinally spaced relation in an ambient atmosphere for cooling of said adhesive strand prior to pressing.

7. The apparatus of claim 6 including means disposed between said discharge orifice and said pressure-applying means for positively applying a cooling fluid to said adhesive strand.

8. The apparatus of claim 2 including means for controlling the pressure applied to said strand for limiting its spread to an extent within the edges of said strip.

9. The apparatus of claim 1 in which said substrate is formed of compressible material and including means disposed upstream of said discharge orifice for pressing said substrate to produce a recess therein elongated in the direction of movement of said substrate for reception of said adhesive strand.

10. The apparatus of claim 1 in which said substrate is formed of compressible material and including means disposed upstream of said discharge orifice for pressing said substrate to produce an elongated recess therein for receiving said adhesive strand, said recess having a depth at least as great as the combined thickness of the pressed adhesive strand and the protective strip received therein.

11. The apparatus of claim 1 in which said substrate is in the form of a continuous elongated body of material; a discharge roll and take-up roll disposed at opposite ends of said frame; and means for driving at least one of said rolls for moving said substrate with respect to said frame.

12. The apparatus of claim 1 in which said substrate is in the form of separate panels; means disposed at opposite ends of said frame for receiving stacks of panels, said stacks including a supply stack at one end of said frame and a product stack at the other end thereof; and means for moving individual panels sequentially from said supply stack into operative relation with said adhesive supply orifice for controllably depositing said adhesive onto said substrate panels in strands extending substantially continuously between opposite edges of each said panel.

13. The apparatus of claim 11 including means for dispensing a protective strip onto said adhesive strands on each of said panels; and cutting means for severing said strip.

14. The apparatus of claim 13 in which said cutting means is arranged to simultaneously cut said strip and a portion of said substrate adjacent said opposite edges of said panels.

15. (Amended) The apparatus of claim 13 in which said protective strip is dispensed continuously with respect to said substrate panels and said cutting means is arranged to sever said strip intermediate facing edges of adjacent panels.

16. The apparatus of claim 1 including heating means associated with said reservoir for maintaining adhesive therein in a flowable state.

17. The apparatus of claim 16 including conduit means for circulating adhesive in a closed circuit with respect to said reservoir; a duct containing said discharge orifice communicating with said conduit; and valve means on said duct for controlling the discharge of adhesive onto said substrate.

18. The apparatus of claim 17 including heating means associated with said duct for heating the adhesive passed therethrough to said discharge orifice.

19. The apparatus of claim 6 in which said discharge orifice is arranged for elevated disposition with respect to said substrate, said orifice being of generally circular cross section for the supply of adhesive in a downward stream of generally circular cross section onto said substrate.

20. An apparatus for producing a substrate having an extended-action adhesive thereon and a detachable strip covering said adhesive prior to use thereof, said apparatus comprising:

a frame having an operating surface thereon;

a reservoir for containing adhesive therein;

means for heating the adhesive in said reservoir to maintain it in a flowable state;

adhesive supply means extending from said reservoir including a discharge orifice operably positioned above said operating surface;

means for moving a substrate across said operating surface with respect to said discharge orifice to receive a strand of adhesive therefrom which extends in the direction of movement of said substrate;

means for cooling said adhesive strand on said substrate to increase the viscosity of the exposed surface of said strand and thereby reduce the adhesion properties thereof to a value less than the adhesion existing between said strand and said substrate;

means for dispensing a strip of thin material that is impermeable to said adhesive and poorly sensitive to the adhesive action thereof and for applying it substantially coextensively with said strand; and means positioned downstream in the substrate-moving sense and operative for engaging said thin protective strip for pressing it and compressing said strand to spread both laterally and longitudinally.

21. The apparatus according to claim 20 in which said strand compressing means comprises a rotatable roller having an axis of rotation substantially perpendicular to said strip positioned to dispose said strip between said roller and said adhesive strand, whereby said strip is applied and said strand is simultaneously compressed to spread longitudinally and laterally between opposed edges of said strip.

22. The apparatus according to claim 20 in which said substrate is formed of a cardboard material having a generally flexible alveolated internal structure and including means disposed upstream from said discharge orifice in the substrate-moving sense for compressing said substrate to weaken the internal structure, but not destroy the flexibility thereof, and produce an elongated recess for reception of said adhesive strand.

23. The apparatus according to claim 22 in which said substrate compressing means comprises a roller having an axis of rotation substantially perpendicular to the direction of movement of said substrate and an operating surface engageable therewith; and means for controlling the extent of application of said roller to produce a recess whose depth corresponds substantially to the cumulative thickness of said strand and said protective strip received therein.

24. The apparatus according to claim 23 in which said adhesive supply means comprises a conduit for circulating said adhesive in a closed circuit to and from said reservoir and a duct having valve means therein and terminating in said discharge orifice.

25. The apparatus according to claim 23 including means for heating said duct.

26. The apparatus according to claim 19 in which said substrate is in the form of a continuous elongated body of material; a discharge roll and a take-up roll disposed at opposite ends of the operating surface on said frame; and means for driving at least one of said rolls for moving said substrate with respect to said operating surface.

27. The apparatus according to claim 19 in which said substrate is in the form of separate panels; means disposed at opposite ends of said operating surface for receiving stacks of panels including a supply stack at one end of said operating surface and a product stack at the other end thereof; and means for moving individual panels from said supply stack sequentially along said operating surface.

28. The apparatus according to claim 27 including means for dispensing said strip continuously with respect to said moving substrate panels; and cutting means arranged to sever said strip to separate said panels.

* * * * *